United States Patent
Oliver

(10) Patent No.: US 8,051,801 B2
(45) Date of Patent: Nov. 8, 2011

(54) ANNULAR ROTARY PLATFORM FOR A MILKING PARLOUR, A MOULD AND METHOD FOR MANUFACTURING OF SUCH A PLATFORM

(75) Inventor: Christopher K. Oliver, Hamilton (NZ)

(73) Assignee: DeLaval Holding AB, Tumba (SE)

( * ) Notice: Subject to any disclaimer, the term of this patent is extended or adjusted under 35 U.S.C. 154(b) by 74 days.

(21) Appl. No.: 12/306,786

(22) PCT Filed: May 10, 2007

(86) PCT No.: PCT/SE2007/050325
§ 371 (c)(1),
(2), (4) Date: Feb. 12, 2009

(87) PCT Pub. No.: WO2008/002253
PCT Pub. Date: Jan. 3, 2008

(65) Prior Publication Data
US 2009/0183687 A1    Jul. 23, 2009

(30) Foreign Application Priority Data
Jun. 28, 2006    (SE) ...................................... 0601415

(51) Int. Cl.
*A01K 1/12* (2006.01)
(52) U.S. Cl. ................................................ 119/14.04
(58) Field of Classification Search ............... 119/14.02, 119/14.03, 14.04, 14.08, 14.09, 14.1, 14.14, 119/528, 525, 526, 530; 404/41, 45, 38; 52/319, 336, 236.5, 414, 245
See application file for complete search history.

(56) References Cited

U.S. PATENT DOCUMENTS

| 694,577 | A | * | 3/1902 | Ransome | 264/34 |
| 921,626 | A | * | 5/1909 | Raster | 52/602 |
| 1,787,152 | A |  | 12/1930 | Hapgood |  |
| 1,871,318 | A | * | 8/1932 | Greenwood | 52/834 |
| 1,968,564 | A | * | 7/1934 | Luks | 119/14.04 |
| 1,969,634 | A | * | 8/1934 | Acuff | 104/41 |
| 1,977,864 | A | * | 10/1934 | Smith | 104/44 |
| 2,035,007 | A | * | 3/1936 | Workman | 52/73 |
| 2,558,580 | A | * | 6/1951 | Pomykala | 52/20 |
| 2,859,504 | A | * | 11/1958 | Crowley | 264/228 |
| 3,153,303 | A | * | 10/1964 | Wheeler | 52/73 |
| 3,600,865 | A | * | 8/1971 | Vanich | 52/73 |

(Continued)

FOREIGN PATENT DOCUMENTS

JP    2001-227064    8/2001

(Continued)

OTHER PUBLICATIONS

International Search Report date Sep. 26, 2007, from corresponding PCT application.

(Continued)

*Primary Examiner* — Rob Swiatek
*Assistant Examiner* — Ebony Evans
(74) *Attorney, Agent, or Firm* — Young & Thompson

(57) ABSTRACT

The invention relates to an annular rotary platform (3) for a milking parlour and a mould and method for manufacturing the annular platform. The platform (3) is formed of a cementitious material. The platform comprises on an underside at least one protruding reinforcing portion (3d) formed of a cementitious material.

30 Claims, 4 Drawing Sheets

U.S. PATENT DOCUMENTS

| | | | | |
|---|---|---|---|---|
| 3,710,526 | A * | 1/1973 | Parks | 52/223.6 |
| 3,828,500 | A * | 8/1974 | Chancey et al. | 52/292 |
| 3,910,452 | A * | 10/1975 | Szasz | 220/226 |
| 3,934,551 | A * | 1/1976 | Sulzberger | 119/14.04 |
| 4,716,837 | A * | 1/1988 | Valencia | 104/38 |
| 4,778,144 | A | 10/1988 | Gregory | |
| 4,979,869 | A * | 12/1990 | Mullin, Jr. | 414/807 |
| 5,086,704 | A * | 2/1992 | Mueller | 104/44 |
| 5,687,673 | A * | 11/1997 | Bowers | 119/14.04 |
| 5,755,160 | A * | 5/1998 | Blufordcraving | 104/36 |
| 5,782,738 | A | 7/1998 | Bowers | |
| 6,050,219 | A * | 4/2000 | van der Lely | 119/14.08 |
| 6,189,288 | B1 | 2/2001 | Bowers | |
| 6,470,640 | B2 * | 10/2002 | Ytterberg | 52/414 |
| 6,817,312 | B2 * | 11/2004 | Battersby et al. | 119/14.04 |
| 7,131,394 | B2 * | 11/2006 | Johannesson et al. | 119/14.03 |
| 2002/0033138 | A1 * | 3/2002 | Brayer | 119/14.03 |
| 2005/0051105 | A1 * | 3/2005 | Hein et al. | 119/14.04 |

FOREIGN PATENT DOCUMENTS

NZ      270955      11/1996

OTHER PUBLICATIONS

Extended European Search Report dated Aug. 3, 2011—Application No. 07748486.3.

* cited by examiner

ANNULAR ROTARY PLATFORM FOR A MILKING PARLOUR, A MOULD AND METHOD FOR MANUFACTURING OF SUCH A PLATFORM

THE BACKGROUND OF THE INVENTION AND PRIOR ART

The present invention relates to an annular rotary platform for a milking parlour, wherein the platform is formed of a cementitious material. The present invention also relates to a mould and a method for manufacturing of such a platform.

The size of a rotary parlour must be adapted to individual farmer's available space and number of cows. A platform of a rotary parlour adapted to receive about 20 to 100 cows is too large to be transported. Therefore, the assembly of rotary parlours in situ is required. Milking cows have a weight of about 600-900 kg. Thus, the platform of a rotary parlour has to have a considerable strength such the platform will not be deflected by the weight of the cows during the rotary motion of the platform and when the cows walk on and back off the platform.

NZ 270 955 shows a rotary milking parlour including an annular platform. The platform consists of concrete and it has a substantially even thickness. A plurality of radially directed steel ribs is arranged on the underside of the platform. Thereby, the annular platform will be substantially stiff in a radial direction but less stiff in a direction along its circular extension. The reduced stiffness in this direction makes it is possible for the platform to maintain a continuous contact, via a circular rail member attached on the underside of the platform, with a number of rolling members arranged below the platform.

However, the manufacturing work of such a platform is relatively complicated since the platform includes a relatively large number of components. Furthermore, such steel ribs are relatively expensive components since they will have the properties of high strength and resistant to corrosion.

SUMMARY OF THE INVENTION

The object of the present invention is to achieve a rotary platform for a milking parlour, which has a reliable function, a good strength and is possible to manufacture to a relatively low cost.

This object is achieved by the rotary parlour initially defined, which is characterised in that the platform on an underside comprises at least one protruding reinforcing portion formed of a cementitious material. The cementitious material may be concrete. The platform achieves in an area provided with such a protruding reinforcing portion of a cementitious material an increased thickness and an increased strength. The protruding reinforcing portion on the underside of the platform may be provided with a suitable design in order achieve a desired strength in different areas and directions of the platform. Preferably, the protruding reinforcing portion and the remaining part of the platform are formed during the same casting process of the cementitious material. Thereby, it is possible to manufacture the platform in a quick and easy manner. Furthermore, the existence of such a protruding reinforcing portion of a cementitious material on the underside of the platform reduces the need of conventional ribs or frameworks of relatively expensive materials such as steel. Consequently, the platform will be manufactured to a relatively low cost.

According to an embodiment of the invention, said protruding reinforcing portion has an elongated shape on the underside of the platform. Thereby, it is possible to provide the platform with an increased strength in the direction of the elongated reinforcing portion. Said protruding reinforcing portion may have an extension in a substantially radial direction on the underside of the annular platform. The platform is quite rigid but in this manner the annular platform will be somewhat stiffer in a radial direction than in a direction along its circular extension. The platform may comprise a plurality of such protruding reinforcing portions arranged in different positions on the underside of the platform. Thereby, it is possible to provide the platform with an increased strength in different areas located at a distance from each other. Preferably, adjacent protruding reinforcing portion are arranged at substantially equal distances from each other on the underside of the platform. Thereby, it is possible to give the floor in the milking stalls on the upper side of the annular platform a substantially corresponding strength.

According to a further embodiment of the invention, the at least one protruding reinforcing portion has a substantially plane end surface located in the vicinity of an inner radial surface of the annular platform. The end surface may be located substantially exactly at the inner radial surface of the annular platform or at a smaller distance from the inner radial surface. Such an end surface may be used for attachment of equipment of different kinds used on the rotary platform. The at least one protruding reinforcing portion may have a substantially plane end surface located in the vicinity of an outer radial surface of the annular platform. This end surface may also be used for attachment of equipment of different kinds used on the rotary platform.

According to a further embodiment of the invention, the platform comprises at least one connecting member constituting a substantially rigid connection between the platform and a circular rail member arranged on an underside of the platform. Rotary platforms have many times such a circular rail member on an underside for allowing rotation of the platform arranged on a number of supporting roller arranged below the platform. Thereby, it is possible to rotate the platform with a low friction and a desired velocity. The connecting member may be a bar or a plate of a strength metal material such as steel. A lower portion of the connecting member may be fixedly connected to the circular rail member for example by welding. Preferably, said connecting member constitutes a connection between the protruding reinforcing portion of the platform and the circular rail member. Since the platform has its highest strength here, it is suitable to connect an upper portion of the connecting member to the platform in this area. Said connecting member may be connected to the platform by means of an upper end portion cast into the cementitious material of the platform. Thereby, the upper end portion of the connecting member achieves a strength and rigid connection with the platform.

According to a further embodiment of the invention, the platform comprises at least one reinforcing element cast into the cementitious material. The reinforcing element may constitute one or several reinforcement bar. A reinforcing element of a strength metal material embedded in a cementitious material supplies a considerable strength to the platform. The reinforcing elements may be elongated and have an extension in a radial direction of the platform in order to further increase the stiffness of the platform in this direction. The protruding reinforcing portion may comprise at least one reinforcing element cast into the cementitious material. Thereby, the strength of the protruding reinforcing portion will be considerably increased. The upper portion of the connecting member, which is embedded in the cementitious material, may be connected to one or several of the reinforcing elements by means of, for example, welding. Thereby, the weight from the platform and the cows standing on the platform will be transferred from the reinforcing element, via the connecting member, to the circular rail member.

According to a further embodiment of the invention, the annular platform may comprise an inner ring of a metal material forming an inner radial surface of the platform. Such an inner ring supplies strength to the platform in the vicinity of the inner radial surface. Furthermore, the inner ring may be used as an inner wall surface of a mould for forming the cemetitious material during the casting process. The annular platform may comprise an outer ring of a metal material forming an outer radial surface of the platform. Such an outer ring supplies strength to the platform in the vicinity of the outer radial surface. Furthermore, the outer ring may be used as an outer wall surface of a mould for forming the cemetitious material during the casting process. Alternatively, the platform can be manufactured without such metal rings.

According to a further embodiment of the invention the annular platform has an upper surface with an inner circumference edge located at a higher level than an outer circumference edge. Preferably, the annular platform has a plane upper surface sloping about 3° in relation to a horizontal plane. This simplifies the cleaning of the platform because water and dirt rinse off easily. Such a sloping of the platform is preferred if the milking members are attached by operators working from the outside of the platform. Alternatively, the annular platform has an upper surface with an inner circumference edge located at a lower level than an outer circumference edge. Such a sloping of the platform is preferred if the milking members are attached by operators working from the inside of the platform.

BRIEF DESCRIPTION OF THE DRAWINGS

The present invention is now to be explained more closely by means of a preferred embodiment, which is disclosed as an example, and with reference to the attached drawings.

BRIEF DESCRIPTION OF PREFERRED EMBODIMENTS OF THE INVENTION

Figure 1:
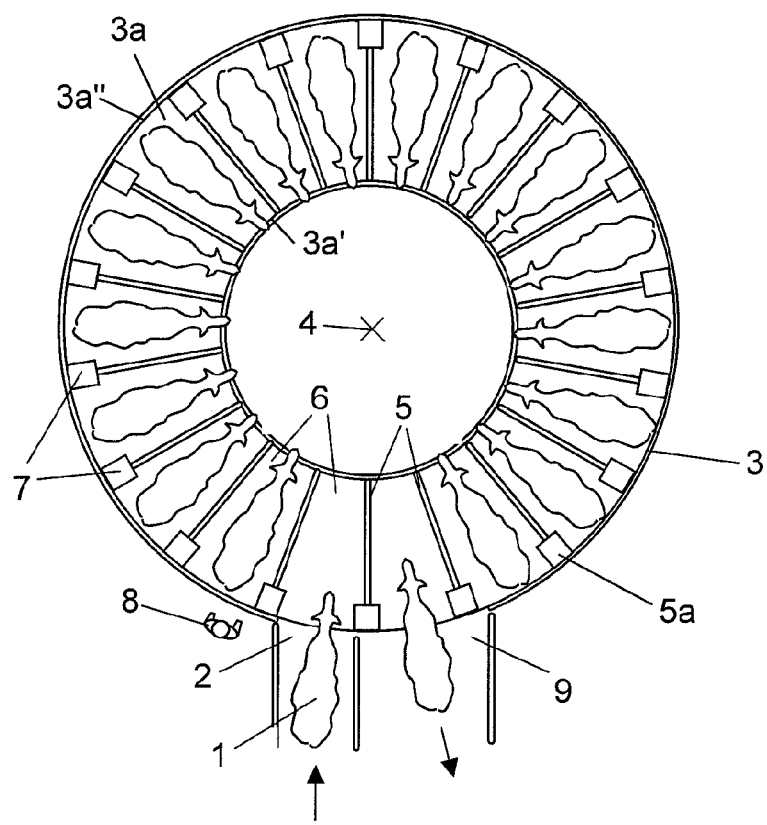
FIG. 1 shows a rotary parlour with a platform for supporting cows to be milked.

FIG. 1 shows a rotary parlour for milking of cows 1. The cows 1 to be milked are arranged to walk through an entry 2 to enter an annular platform 3. The platform 3 is rotatably arranged around a substantially vertical axis 4. The platform 3 is substantially formed of a cementitious material such a concrete. The platform 3 has a substantially plane upper surface 3a for supporting cows 1 to be milked. However, an inner circumference edge 3a' of the annular platform 3 is located at a somewhat higher level than an outer circumference edge 3a" of the platform 3. Consequently, the upper surface 3a of the platform has a smooth sloop in relation to a horizontal plane. Thereby, it is easy to clean the platform 3 since water and dirt rinse off easily.

A plurality of fence arrangements 5 are mounted on the platform, which divide the platform 3 into stalls 6 for receiving individual cows 1. In this case, the fence arrangements 5 have a substantially radial extension on the platform 3 in relation to the vertical axis 4. The fence arrangement 5 comprises a stiff cabinet 5a arranged at an outer radial position of the platform 3, which constitute a supporting element of the fence arrangement 5. The cabinet 5a has an inner space, which may accommodate milking equipment and other components in the stall 6. An alternative to the cabinet 5a is a post or the like arranged at an outer position of the platform 3. The stalls 6 are here arranged such that the cows face inwards from the stalls 6 and operators 8 work from the outside of the annular platform 3. An operator 8 may, for example, attach milking members to the cows 1 when they have entered a stall 6. The cows rotate nearly 360° on the platform 3 during a milking operation. The cows 1 leave the stall 6 and the platform 3 through an exit 9 after having been milked and possibly fed during the milking operation.

Figure 2:
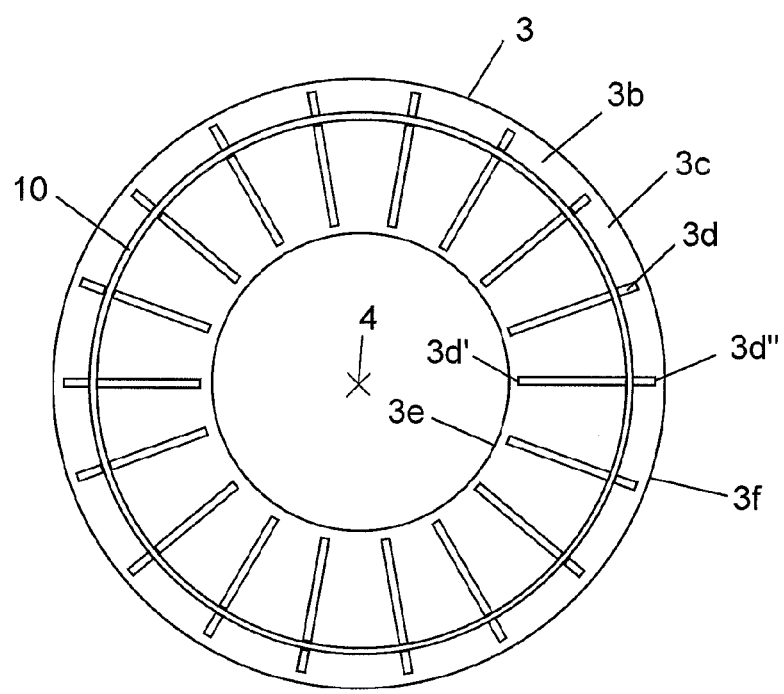
FIG. 2 shows a view from the underside of the platform in FIG. 1.

FIG. 2 shows a view of the platform 3 from the underside. The platform 3 has a lower surface 3b comprising substantially plane areas 3c and areas comprising protruding reinforcing portions in the form of ribs 3d. The ribs 3d have an elongated shape and an extension in a substantially radial direction on the underside of the annular platform 3. Adjacent ribs 3d are arranged at substantially equal distances from each other around the lower surface 3b of the annular platform 3. The ribs 3d have a substantially plane end surface 3d' located in the vicinity of an inner radial surface 3e of the annular platform and a substantially plane end surface 3d" located in the vicinity of an outer radial surface 3f of the annular platform. In this case, the end surfaces 3d', 3d" of the ribs 3d are located at a smaller distance from the inner radial surface 3e and the outer radial surface 3f of the platform. A circular rail member 10 is rigidly connected to the underside of the platform 3.

Figure 3:
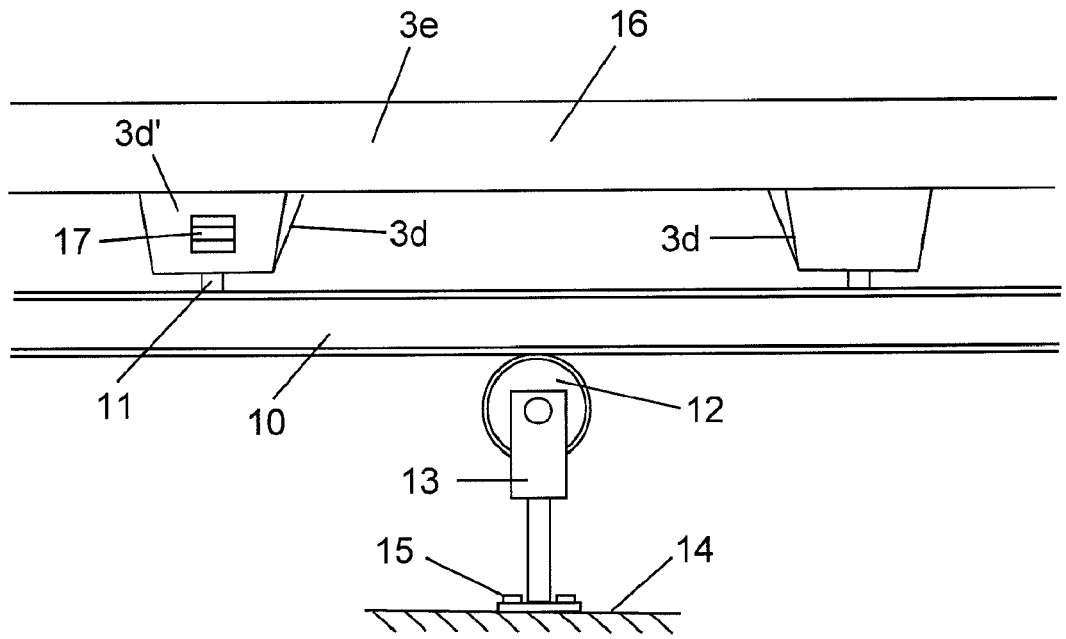
FIG. 3 shows a view from the inside of the annular platform.

FIG. 3 shows a view from the inside of the annular platform 3. The circular rail member 10 is connected to the ribs 3d of the platform by means of connecting members in the form of flat steel plates 11. A lower portion of the steel plates 11 is welded to the circular rail member 10 and a upper portion of the steel plates 11 is cast into the cementitious material forming the ribs 3d. The rail member 10 has a lower surface to be in contact with a plurality of rollers 12 arranged on stands 13 in different positions below the circular rail member 10. One stand 13 with one roller 12 is shown in FIG. 3. The stand 13 is arranged on a floor 14 located below the platform 3 by means of a bolt connection 15. At least one of the rollers 12 is driven by a motor. Thereby, it is possible to perform a rotary motion of the platform 3 with a desired rotary speed and a minimum of friction.

The inner radial surface 3e of the annular platform can be formed by an inner ring of a metal material 16. The substantially plane end surfaces 3d' of the ribs 3d constitute a surface which can be used for attachment of equipment of different kind used on the rotary platform. FIG. 3 shows such equipment in the form of a schematically disclosed hanger 17 for supporting of pipelines and electrical conduits etc. It is also possible to use the plane outer end surfaces 3d" of the ribs 3d for attachment of equipment of different kind.

Figure 4:
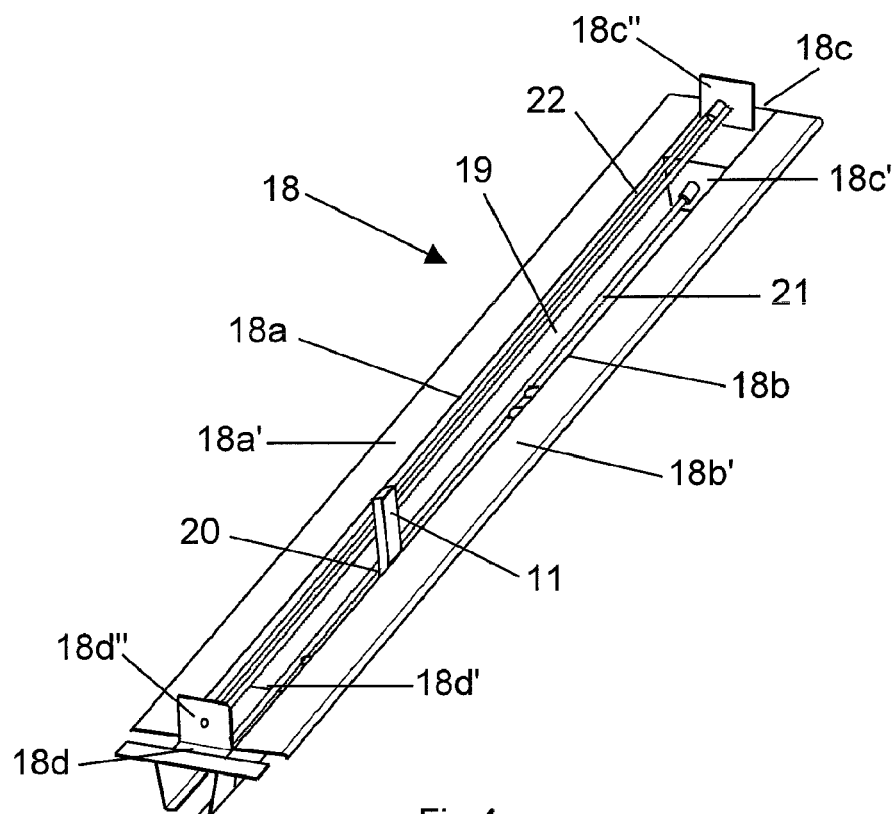
FIG. 4 shows a rib form for manufacturing of one rib on the underside of the platform.

FIG. 4 shows a rib form 18 for forming one of the ribs 3d on the underside of the platform 3. The rib form 18 is constructed of an elongated left half 18a and an elongated right half 18b which are connected to each other at a bottom surface. Each of the elongated halves 18a, b comprise an upper substantially plane surface 18a', 18b'. The halves 18a, b forms, in a connected state, an elongated cavity 19 between the upper plane surfaces 18a', 18b'. The rib form 18 also comprises an inner rib blocking part 18c and an outer rib blocking part 18d. The inner rib blocking part 18c and the outer rib blocking part 18d are attachable to the halves 18a, b at opposite ends. The inner rib blocking part 18c has a wall element 18c' which defines the plane inner end surfaces 3d' of a rib 3d. The outer rib blocking part 18d has a corresponding wall element 18d' which defines the plane outer end surfaces 3d" of a rib 3d. The rib form 18 comprises an opening 20 at a bottom portion of the cavity 19 through which the flat steel plate 11 is insertable. A first reinforcing element 21, which comprises a reinforcement bar mounted between two tubular end elements, has been mounted inside the cavity 19. The first reinforcing element 21 is welded to the flat steel plate 11. The first reinforcing element 21 is mountable in the cavity 19 by means of bolts extending through corresponding holes in the wall elements 18c', 18d' and the tubular end elements of the reinforcing element 21. A second reinforcing element 22, which comprises two parallel reinforcement bars mounted between two tubular end elements, is mountable between connecting plates 18c", 18d" of the rib blocking parts 18c, 18d by means of bolts extending through corresponding holes in the connecting plates 18c", 18d" and in the tubular end elements of the reinforcing element 22. The second reinforcing element 22 is also welded to the flat steel plate 11. The assembly work of the rib forms 18 may be performed in a factory or the like before the platform components are delivered to site. In case where factory pre-assemble is not possible, the rib forms 18 will be assembled in situ.

Figure 5:
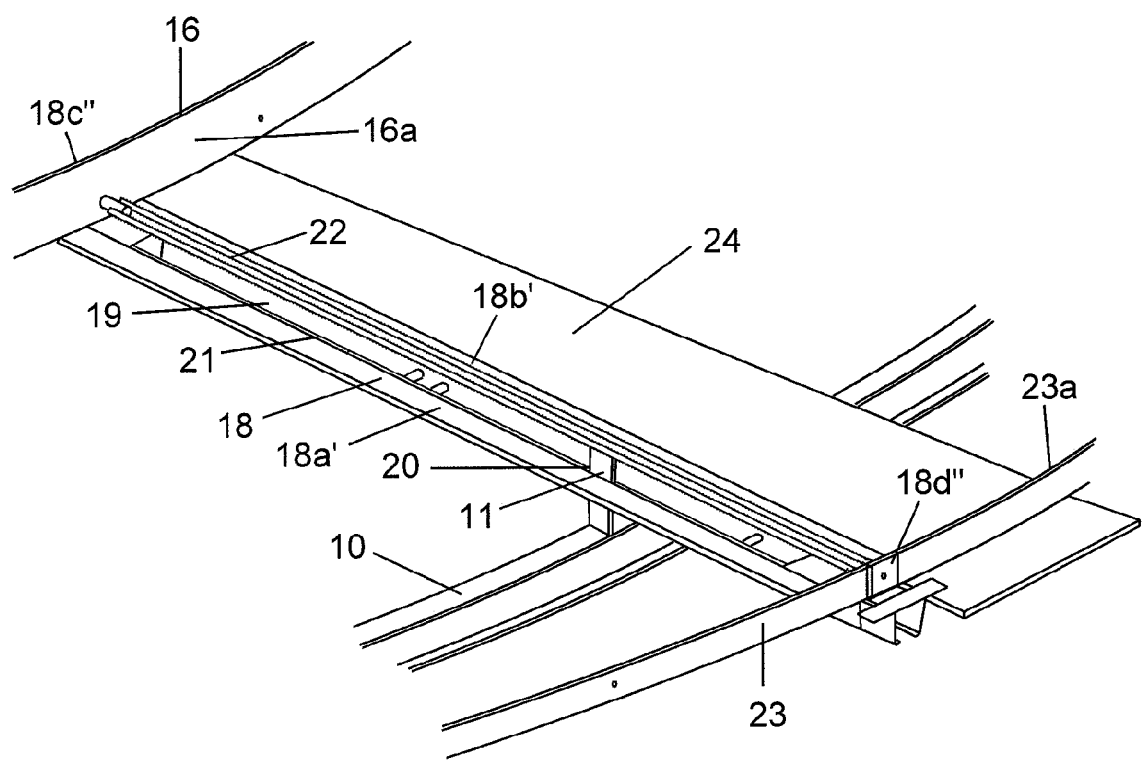
FIG. 5 shows a part of a annular mould for casting of the platform and FIG. 6 shows a view from the underside of an alternative platform.

FIG. 5 shows a part of an annular mould for casting of the platform 3. The annular mould comprises the inner ring 16 of a metal material. The inner ring 16 is adapted to define an inner circular substantially vertical wall surface 16a of the annular platform. The annular mould comprises an outer ring 23 of a metal material. The outer ring 23 is adapted to define an outer circular substantially vertical wall surface 23a of the annular mould. One rib form 18 with reinforcing elements 21, 22 has been mounted between the inner ring 16 and the outer ring 23. An upper portion of the flat steel plate 11 extends through the opening 20 of the rib form 18 and into the cavity 19. A suitable number of such rib form 18 are adapted to be mounted with substantially equal intervals around the annular mould. Thereafter, plane shuttering panels 24 are arranged in the spaces between the plane upper surfaces 18a', 18b' of adjacent rib forms 18. The shuttering panels 24 and the forms 18 define together the bottom surface of the annular mould.

A method for manufacturing of the platform 3 can be performed as followed. The inner ring 16 and the outer ring 23 are arranged in mutually defined positions in relation to each other. The rings 16, 23 are arranged on a suitable level above the circular rail member 10. A plurality of rib form 18 are mounted between the inner ring 16 and the outer ring 23 such that adjacent rib forms 18 are mounted at equal distances from each other. Each rib form 18 is attached to the inner ring 16 by means of a bolt extending through corresponding holes in the connecting plate 18c" of the rib form and the inner ring 16. This bolt also extends into the inner tubular end element of the reinforcing element 22 for attachment of the reinforcing element 22 to the inner ring 16. Each rib form 18 is attached to the outer ring 23 by means of a bolt extending through corresponding holes in the connecting plate 18d" of the rib form 18 and the outer ring 23. This bolt also extends into the outer tubular end element of the reinforcing element 22 for attachment of the reinforcing element 22 to the outer ring 23. First reinforcing elements 21 are mounted in the cavities 19 of the respective rib forms 18 by means of bolts extending through corresponding holes in the wall elements 18c', 18d' and the tubular end elements of the reinforcing element 21. Flat steel plates 11 are connected to the first reinforcing element 21 and the second reinforcing element 22 by welding in the respective rib forms 18. A lower part of the flat steel plates 11 are welded to an upper part of the circular rail member 10. The plane shuttering panels 24 are arranged in the spaces between the plane upper surfaces 18a', 18b' of adjacent rib forms 18. Thereby, the annular mould is constructed. The shuttering panels 24 and the rib forms 18 define together the bottom surface of the annular mould, the inner ring 16 defines an inner circular vertical wall surface of the annular mould and the outer ring 23 defines an outer circular vertical wall surface of the annular mould.

A flowable cementitious material is supplied to the annular mould in a quantity such that the annular mould is filled up. When the cementitious material has been poured and cured, the rib forms 18 and the shuttering panels 24 are removed. A platform 3 is now manufactured in the form of an integral structure which comprises a poured annular body of cementitious material with embedded reinforcing elements 21, 22 and rings 16, 23 defining the inner and outer periphery surfaces of the platform 3. Furthermore, the platform 3 has a lower surface 3b comprising areas with a substantially plane surface 3c and areas comprising protruding ribs 3d. Both the ribs 3d and the reinforcing elements 21, 22 has an extension in a radial direction of the annular platform 3. Thereby, the annular platform 3 will be stiffer in a radial direction than in a direction along its circular extension. The inner ring 16 has an upper edge portion located at a higher level then the upper edge portion of the outer ring 23. Thereby, the upper surface 3a of the annular platform 3 obtains an inner circumference edge 3a' located at a higher level then the outer circumference edge 3a".

Figure 6:
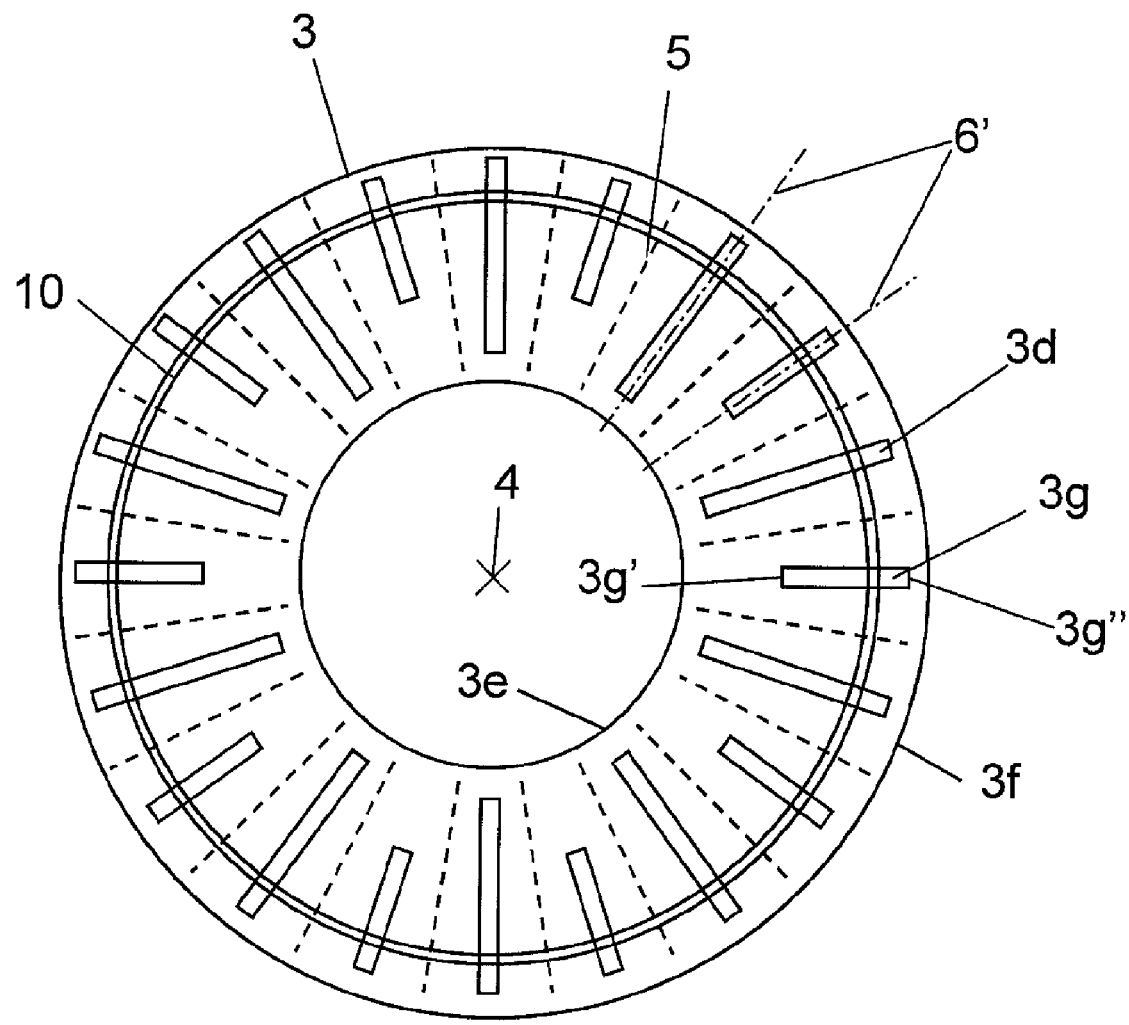

FIG. 6 shows a view from the underside of an alternative annular platform 3. In this case, the platform 3 comprises alternating long ribs 3d and short ribs 3g arranged at substantially equal distances from each other on the underside of the annular platform 3. The short ribs 3g has a substantially plane end surface 3g' located at a relatively large distance from the inner radial surface 3e of the platform and a substantially plane end surface 3g" located in the vicinity of the outer radial surface 3f of the platform. The circular rail member 10 is rigidly connected to both the long ribs 3d and short ribs 3g on the underside of the platform 3. The positions of the fence arrangements 5, which define the milking stalls 6 on the upper side of the platform 3, are shown with doted lines in FIG. 6. Each of the milking stalls 6 can be divided in two equal halves by vertical planes 6' having an extension through a centre of the respective milking stalls 6. The long rib 3d or a short rib 3g are arranged in positions on the underside of the platform such that each of said vertical planes 6' has an extension through a long rib 3d or a short rib 3g.

The invention is not restricted to the described embodiment in the figures, but may be varied freely within the scope of the claims.

The invention claimed is:

1. An annular rotary platform (3) for a milking parlour, wherein the platform (3) is formed of a cementitious material, characterised in that the platform on an underside comprises plural protruding reinforcing portions (3d) formed of a cementitious material, said upper surface having a plurality of milking stalls, wherein said plural protruding reinforcing portions have the form of radially extending ribs.

2. A platform according to claim 1, wherein each said protruding reinforcing portion (3d) has an elongated shape on the underside of the platform (3).

3. A platform according to claim 1, wherein at least two of the elongated protruding portions (3d, 3g) having different extensions.

4. A platform according to claim 1, wherein adjacent protruding reinforcing portion (3d) are arranged at substantially equal distances from each other on the underside of the platform (3).

5. A platform according to claim 1, wherein each said protruding reinforcing portion (3d) has a substantially plane end surface (3d') located in the vicinity of an inner radial surface (3e) of the annular platform (3).

6. A platform according to claim 1, wherein each said protruding reinforcing portion (3d) has a substantially plane end surface (3d") located in the vicinity of an outer radial (3f) surface of the annular platform (3).

7. A platform according to claim 1, wherein the platform (3) further comprises at least one connecting member (11) constituting a substantially rigid connection between the platform (3) and a circular rail member (10) arranged on an underside of the platform (3).

8. A platform according to claim 7, wherein said connecting member (11) constitutes a connection between the protruding reinforcing portion (3d) of the platform and the circular rail member (10).

9. A platform according to claim 7, wherein said connecting member (11) is connected to the platform (3) by means of an upper end portion cast into the cementitious material of the platform (3).

10. A platform according to claim 1, wherein the platform (3) comprises at least one reinforcing element (21, 22) cast into the cementitious material.

11. A platform according to claim 1, wherein each protruding reinforcing portion (3d) comprises at least one reinforcing element (21) cast into the cementitious material.

12. A platform according to claim 1, wherein the annular platform (3) comprises an inner ring (16) of a metal material forming an inner radial surface (3e) of the platform (3).

13. A platform according to claim 1, wherein the annular platform (3) comprises an outer ring (23) of a metal material forming an outer radial surface (3f) of the platform (3).

14. A platform according to claim 1, wherein the annular platform (3) has an upper surface (3a) with an inner circumference edge (3a') located at a higher level than an outer circumference edge (3a").

15. A platform according to claim 1, wherein the annular platform (3) has an upper surface (3a) with an inner circumference edge (3a') located at a lower level than an outer circumference edge (3a").

16. A platform according to claim 1, wherein a first of the protruding reinforcing portions has a first length in the radial direction and a second of the protruding reinforcing portions has a second length in the radial direction greater than the first length.

17. A platform according to claim 1, further comprising:
a circular rail member (10);
the circular rail member fixedly connected to the protruding reinforcing portions of the platform;
plural rollers (12); and
plural stands (13) located below the circular rail member, the rollers arranged on the stands,
wherein the platform is rotatable on the rollers.

18. A platform according to claim 17, wherein,
the circular rail member is fixedly connected to the protruding reinforcing portions of the platform by a connecting member (11) connected to the platform (3) by an upper end portion cast into the cementitious material of the protruding reinforcing portion.

19. An annular rotary platform for a milking parlour, comprising:
an annular platform (3), the platform configured for rotating around a substantially vertical axis (4) and having an inner radial surface (3e) and an outer radial surface (3f),
the platform having an substantially planar cementitious material upper surface (3a) for supporting animals (1) to be milked, said upper surface having a plurality of milking stalls,
the platform having an underside with a cementitious material lower surface (3b) comprising i) plural protruding reinforcing portions (3d) of the cementitious material, and ii) cementitious material, substantially planar areas (3c) extending between the protruding reinforcing portions,
the protruding reinforcing portions of the cementitious material having an elongated shape and extending in a substantially radial direction on the underside of the platform,
the platform being formed of the cementitious material from the upper surface through to the lower surface including the protruding reinforcing portions and the substantially planar areas extending between the protruding reinforcing portions.

20. The annular rotary platform for a milking parlour of claim 19, wherein,
the protruding reinforcing portions are in a form of ribs,
the ribs are arranged adjacent each other at substantially equal distances from each other around the lower surface of the platform, and
the ribs have a substantially planar first end surface (3d') located in a vicinity of the inner radial surface (3e) of the platform and a substantially planar second end surface (3d") located in a vicinity of the outer radial surface (3f) of the annular platform.

21. The annular rotary platform for a milking parlour of claim 20, wherein,
an inner circumference edge (3a') of the platform is located at a higher level than an outer circumference edge (3a") of the platform, and
the upper surface of the platform has a sloop in relation to a horizontal plane from the inner circumference edge (3a') of the platform toward the outer circumference edge (3a") of the platform.

22. The annular rotary platform for a milking parlour of claim 20, further comprising:
a circular rail member (10);
connecting members (11);
the circular rail member connected to the ribs of the platform by the means of the connecting members, a lower portion of the connecting members fixed to the circular rail member and a upper portion of the connecting members fixed to the ribs;
plural rollers (12); and
plural stands (13) located below the circular rail member, the rollers arranged on the stands,
wherein the platform is rotatable on the rollers.

23. The annular rotary platform for a milking parlour of claim 20, further comprising:
a circular rail member (10);
the circular rail member fixedly connected to the ribs of the platform;
plural rollers (12); and
plural stands (13) located below the circular rail member, the rollers arranged on the stands,
wherein the platform is rotatable on the rollers.

24. A platform according to claim 19, wherein a first of the protruding reinforcing portions has a first length in the radial direction and a second of the protruding reinforcing portions has a second length in the radial direction greater than the first length.

25. A platform according to claim 19, wherein said protruding reinforcing portions (3d) have an extension in a substantially radial direction on the underside of the annular platform (3).

26. A platform according to claim 25, wherein adjacent protruding reinforcing portions (3d) are arranged at substantially equal distances from each other on the underside of the platform (3).

27. A platform according to claim 19, wherein at least one protruding reinforcing portion (3d) has a substantially plane end surface (3d') located in a vicinity of the inner radial surface (3e) of the annular platform (3).

28. A platform according to claim 27, wherein the at least one protruding reinforcing portion (3d) has a substantially plane end surface (3d") located in the vicinity of the outer radial (3f) surface of the annular platform (3).

29. A platform according to claim 19, wherein the protruding reinforcing portions (3d) comprise at least one reinforcing element (21) cast into the cementitious material of the protruding reinforcing portions.

30. A platform according to claim 19, further comprising:
an inner metal ring (16) on the inner radial surface (3e) of the platform (3); and
an outer metal ring (23) on the outer radial surface (3f) of the platform (3).

* * * * *